(12) United States Patent  
Sundararajan (10) Patent No.: US 7,860,956 B2  
(45) Date of Patent: Dec. 28, 2010

(54) TRANSFERRING SELECTED OPEN BROWSER TABS FROM A HOST COMPUTER TO A CLIENT COMPUTER

(75) Inventor: Meena Sundararajan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 12/366,252

(22) Filed: Feb. 5, 2009

(65) Prior Publication Data

US 2010/0198918 A1 Aug. 5, 2010

(51) Int. Cl.  
G06F 15/16 (2006.01)
(52) U.S. Cl. ............ 709/221; 709/205; 709/207; 709/229; 709/203; 709/217; 709/219; 709/231; 709/200; 709/201; 709/202; 715/205; 715/234; 715/233; 715/862; 715/838
(58) Field of Classification Search ......... 709/200–205, 709/207, 217, 219, 231, 229  
See application file for complete search history.

(56) References Cited

U.S. PATENT DOCUMENTS

| | | |
|---|---|---|
| 2003/0197735 A1 | 10/2003 | Woltzen |
| 2006/0206834 A1 | 9/2006 | Fisher et al. |
| 2007/0079259 A1* | 4/2007 | Sauve et al. ............ 715/856 |
| 2008/0040682 A1 | 2/2008 | Sorenson et al. |
| 2008/0059584 A1 | 3/2008 | Lam et al. |

2008/0301562 A1* 12/2008 Berger et al. ............ 715/733

OTHER PUBLICATIONS

"Safari Extender 1.6.6," Batista.org, updated Jun. 24, 2008, http://batista.org/extender.html.
Fridrich, "Linkwad 1.5.2," Firefox Add-ons, Mozilla, updated Mar. 18, 2008, https://addons.mozilla.org/en-US/firefox/addon/3263.
"Send Tab URLs 0.4.1," AE Creations, Firefox Add-ons, Mozilla, updated Jun. 24, 2008, https://addons.mozilla.org/en-US/firefox/addon/4437.
Gibbons, "Tab URL Copier 1.1.8.20061010," Firefox Add-ons Mozilla, updated Jun. 24, 2008, https://addons.mozilla.org/en-US/firefox/addon/2069.
"MultiZilla Features," mozdev.org, last modified Jul. 3, 2008, http://multizilla.mozdev.org/features/index.html.

\* cited by examiner

*Primary Examiner*—Jude J Jean Gilles  
(74) *Attorney, Agent, or Firm*—Dillon & Yudell LLP (57) ABSTRACT

A method, system, and computer program product for transferring selected open browser tabs from a host computer to a client computer. The method includes copying a selected number of hyperlink addresses from a plurality of hyperlink addresses associated with a plurality of selected open browser tabs in a first browser of the host computer. A hyperlink import module of the client computer is activated for transferring the copied hyperlink addresses from the host computer. Before the transfer can occur, the client computer is authenticated. After authentication, the user of the client computer selects a subset of the copied hyperlink addresses from the host computer. Only the subset of the copied hyperlink addresses is transferred from the host computer to the client computer. The client user opens the subset of the copied hyperlink addresses in a second browser of the client computer for displaying.

12 Claims, 7 Drawing Sheets

TRANSFERRING SELECTED OPEN BROWSER TABS FROM A HOST COMPUTER TO A CLIENT COMPUTER

BACKGROUND OF THE INVENTION

The present disclosure relates to internet browsing environments, and more particularly to a hyperlink import utility for transferring selected open browser tabs from a host computer to a client computer.

Many of today's internet browsers (e.g., Firefox, Internet Explorer, and the like) allow a user to open multiple browsing tabs within a same browsing window. The user can then toggle between the various browser tabs with greater efficiency. Moreover, the functionality of some browsers have been extended to allow a user to save (i.e., bookmark) either a single browser tab or all open browser tabs in a browser tab set. Moreover, some browsers contain extenders that allow a user to compose an e-mail to another remote user, whereby the e-mail contains the current web address of the webpage that the host user is viewing in his or her browser. In this regard, the e-mail can include the web locations of all of a user's open tabs contained on the user's browser. However, such browsing technologies suffer from a number of drawbacks. First, current browsers do not allow a host user to save a selected number of open tab(s) from among the entire open browser tab set. In addition, such technologies fail to provide a direct and secure peer-to-peer transfer protocol whereby a client user may independently attempt to access a select number of open browser tabs from the host computer's saved browser tab set.

SUMMARY OF THE ILLUSTRATIVE EMBODIMENTS

A method, system, and computer program product for transferring selected open browser tabs from a host computer to a client computer are disclosed. The method includes copying a selected number of hyperlink addresses from a plurality of hyperlink addresses associated with a plurality of selected open browser tabs in a first browser of the host computer. A hyperlink import module of the client computer is activated for transferring the copied hyperlink addresses from the host computer. Before the transfer can occur, the client computer is authenticated. After authentication, the user of the client computer selects a subset of the copied hyperlink addresses from the host computer. Only the subset of the copied hyperlink addresses is transferred from the host computer to the client computer. The subset of the copied hyperlink addresses is opened in a second browser of the client computer. The subset of copied hyperlink addresses is displayed in the second browser using a display.

The above as well as additional features of the present invention will become apparent in the following detailed written description.

BRIEF DESCRIPTION OF THE SEVERAL VIEWS OF THE DRAWINGS

Aspects of the invention itself will best be understood by reference to the following detailed description of an illustrative embodiment when read in conjunction with the accompanying drawings, where.

DETAILED DESCRIPTION OF THE INVENTION

Figure 1:
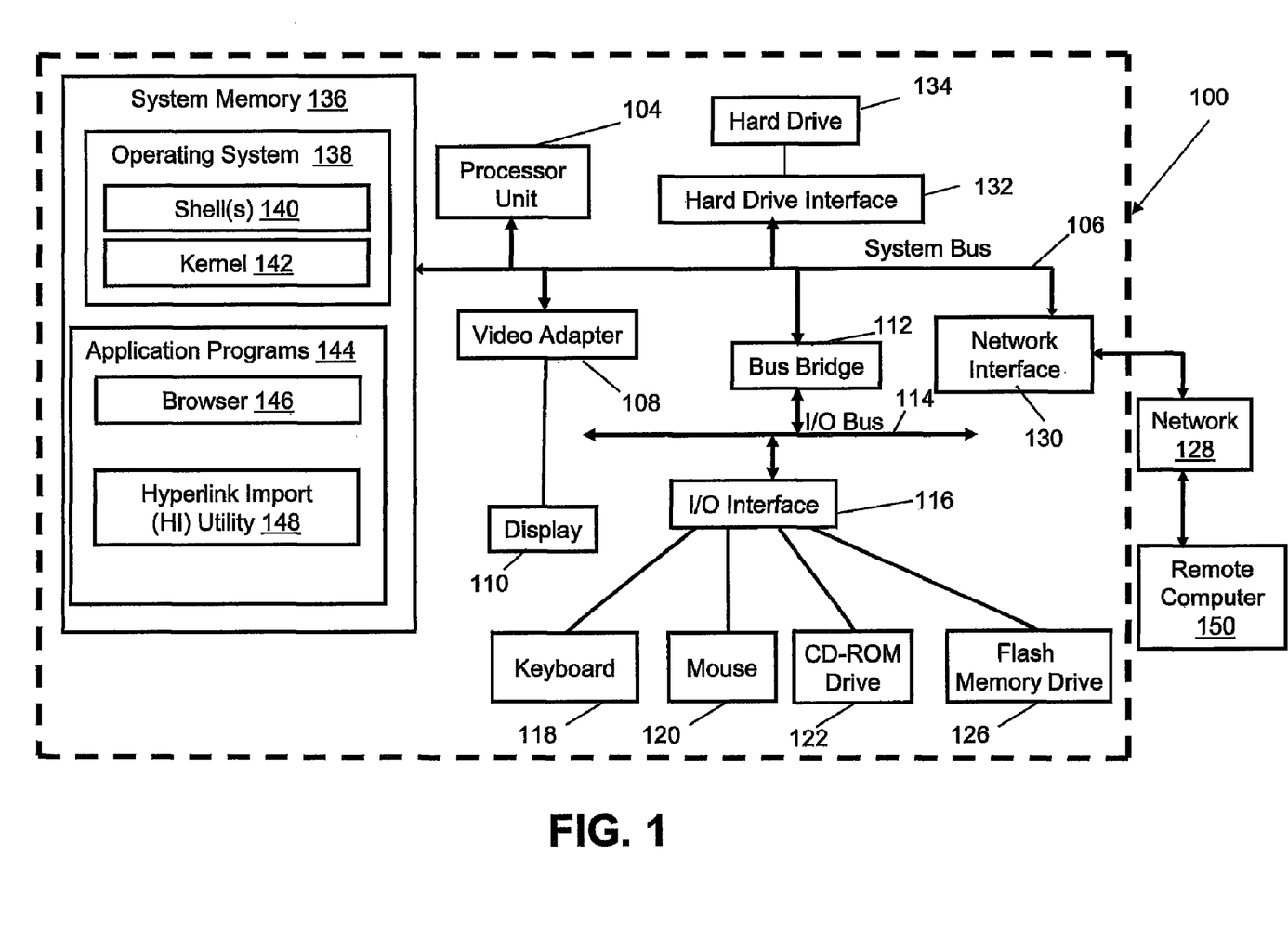
FIG. 1 depicts an exemplary computing environment in which the present invention may be implemented.

With reference now to the figures, and in particular to FIG. 1, there is depicted a block diagram of an exemplary client computer 100, with which the present invention may be utilized. Client computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Client computer 100 is able to communicate with a remote host computer 150 via a network 128 using a network interface 130, which is coupled to system bus 106. Network 128 may be an external network such as the Internet, or an internal network such as an Ethernet or a Virtual Private Network (VPN). Host computer 150 may be architecturally configured in the manner depicted for client computer 100. For purposes of this disclosure, it should be noted that the term "host computer" refers to a computer from which browser tabs are transferred. Moreover, the term "client computer" refers to a computer to which browser tabs are transferred. No further import is to be assigned to "host computer" or "client computer" other than what is expressly stated in this disclosure.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in client computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX® (UNIX is a registered trademark of The Open Group in the United States and other countries)) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client computer 100 to send and receive network messages to the Internet. Client computer 100 may utilize File Transfer Protocol (FTP) or HyperText Transfer Protocol (HTTP) messaging to enable communication with host computer 150. Application programs 144 in system memory 136 also include a Hyperlink Import (HI) utility 148. HI utility 148 performs the functions illustrated below in FIG. 2, and may include all logic, helper functions, databases and other resources depicted below in FIGS. 3-7.

The hardware elements depicted in client computer 100 are not intended to be exhaustive, but rather represent and/or highlight certain components that may be utilized to practice the present invention. For instance, client computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
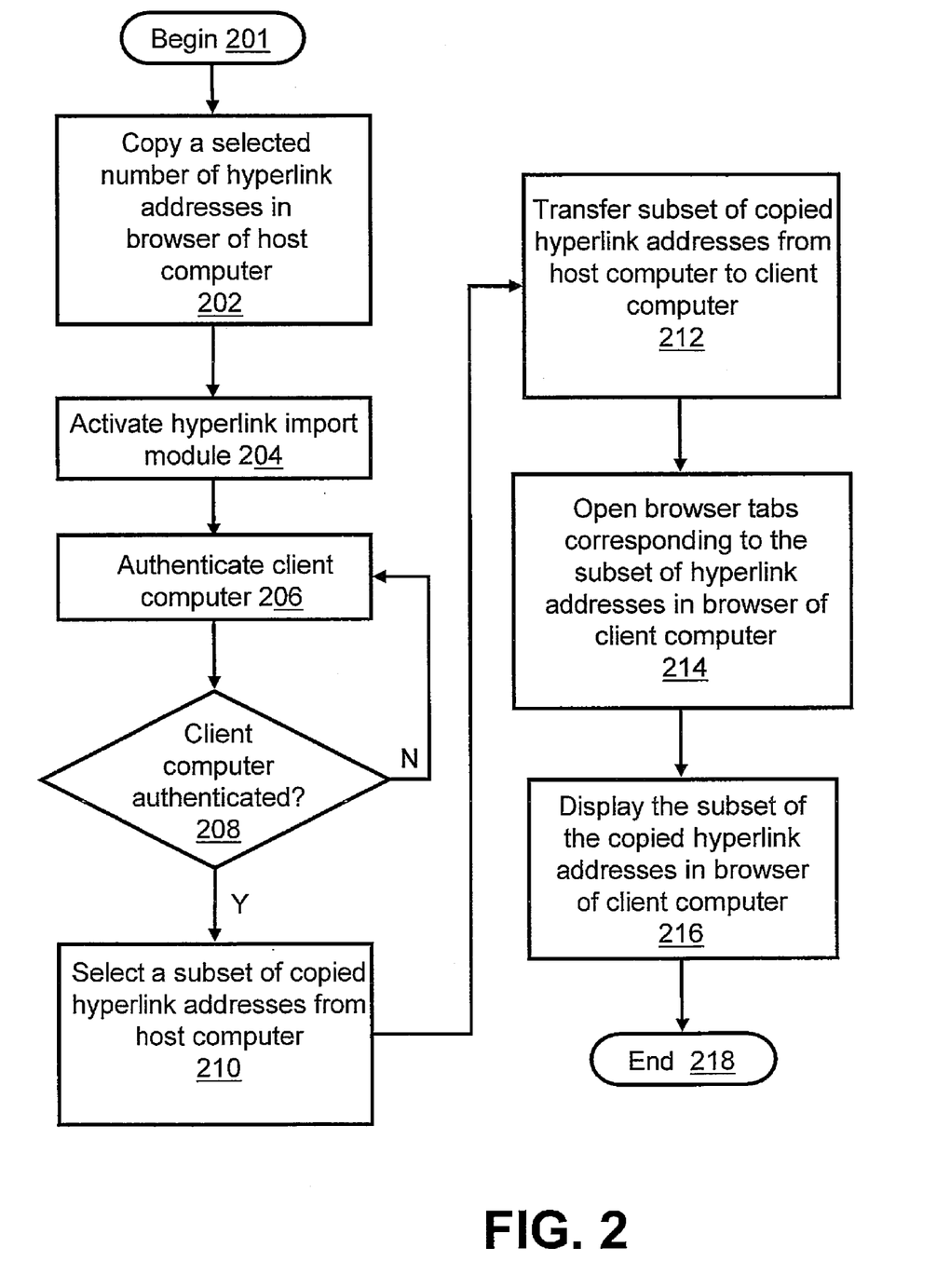
FIG. 2 is a high-level flow-chart of exemplary method steps taken to implement Hyperlink Import (HI) utility for transferring selected open browser tabs from a host computer to a client computer in accordance with one embodiment of the present invention.

As described in exemplary manner below, the present invention provides for a method, system, and computer program product for transferring selected open browser tabs from a host computer to a client computer. With reference now to FIG. 2, a high-level flow-chart of the method is shown. The description of the method illustrated by flowchart FIG. 2 is supplemented by references to various elements illustrated in FIGS. 1 and 3-7. After initiator block 201, HI utility 148 (FIG. 1) copies a selected number of hyperlink addresses in browser of host computer 150 (FIG. 1), as depicted in block 202. The hyperlink addresses are selected from a plurality of hyperlink addresses associated with a plurality of selected open browser tabs in a browser (not shown) of host computer 150.

Figure 3:
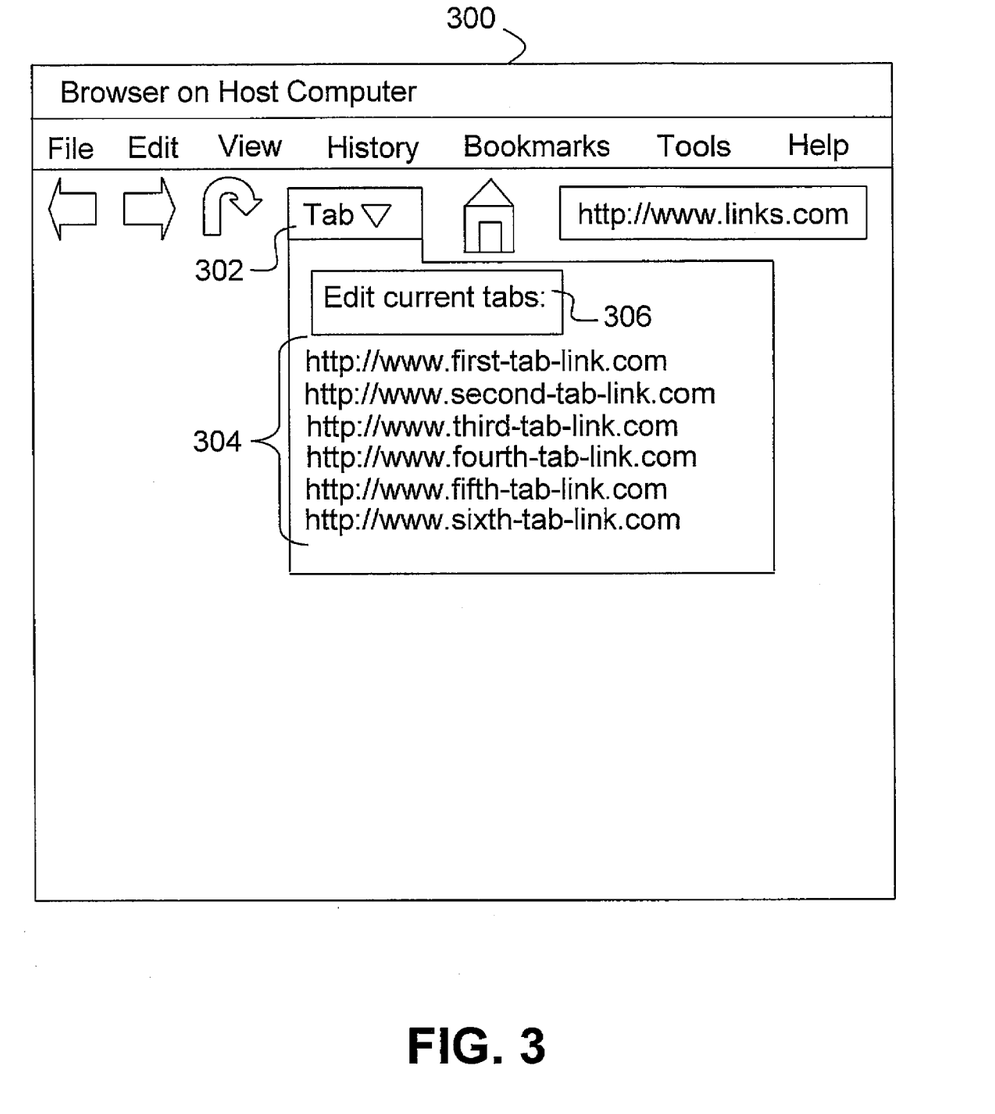
FIG. 3 is a graphical representation of a browser screenshot implementing the HI utility in accordance with one embodiment of the present invention.

The above step 202 is illustrated in FIG. 3, which shows a graphical representation of an exemplary browser 300 of host computer 150 (FIG. 1), according to one embodiment of the invention. A tab drop down box 302 lists an exemplary set of hyperlink addresses 304 associated with a plurality of selected open tabs of browser 300. According to the example shown, tab drop down box 302 lists six different hyperlink addresses 304. Tab edit box 306 can be selected to edit the hyperlink addresses that are currently open in the multiple tabs being displayed on the host computer's browser 146 (FIG. 1). In this regard, each one of the currently open tabs can be selectively highlighted (i.e., multi-selected) and copied (e.g., using a mouse right-click or Ctrl-C key entry). According to one exemplary embodiment, the selected hyperlink addresses 304 are saved under a file folder arbitrarily named "TestingTransfer" (not shown).

Figure 4:
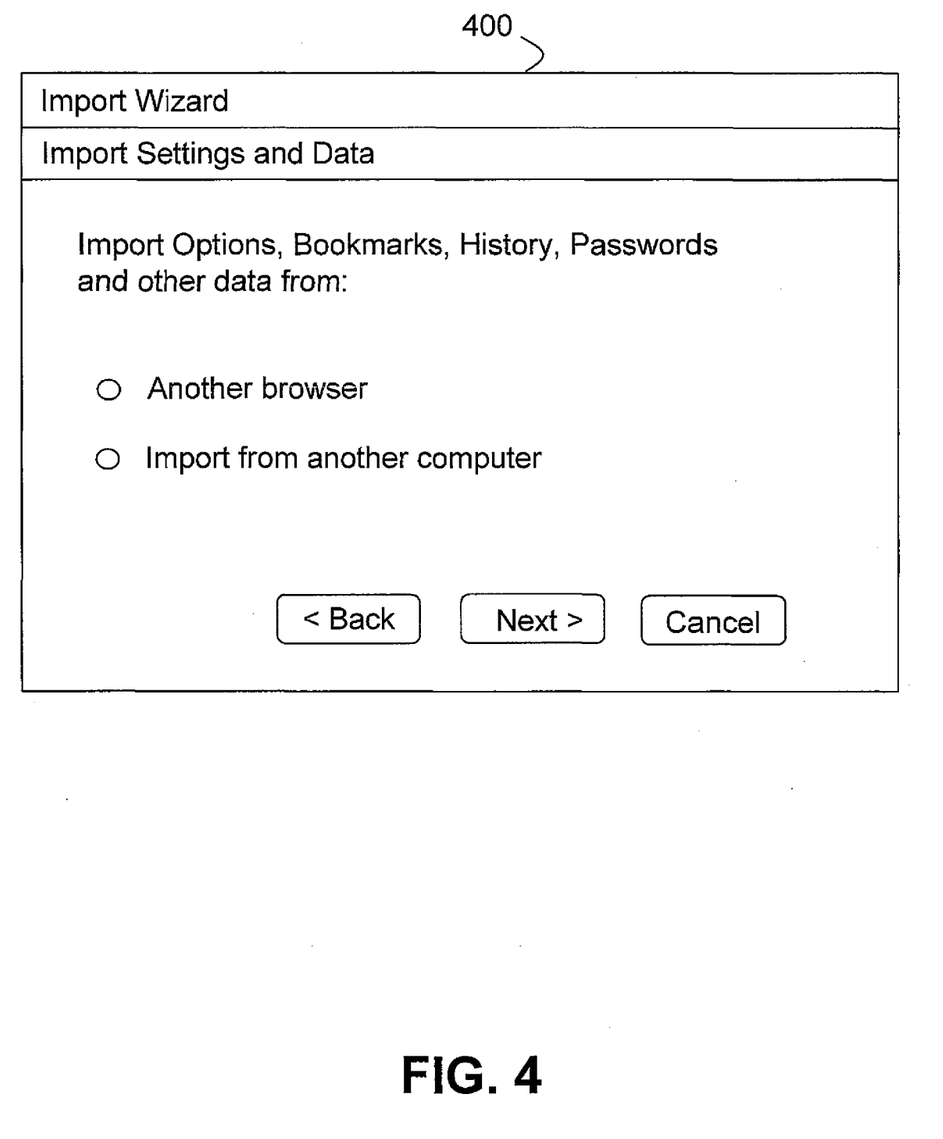
FIGS. 4-6 are graphical representations of HI utility in accordance with one embodiment of the present invention.
Figure 5:
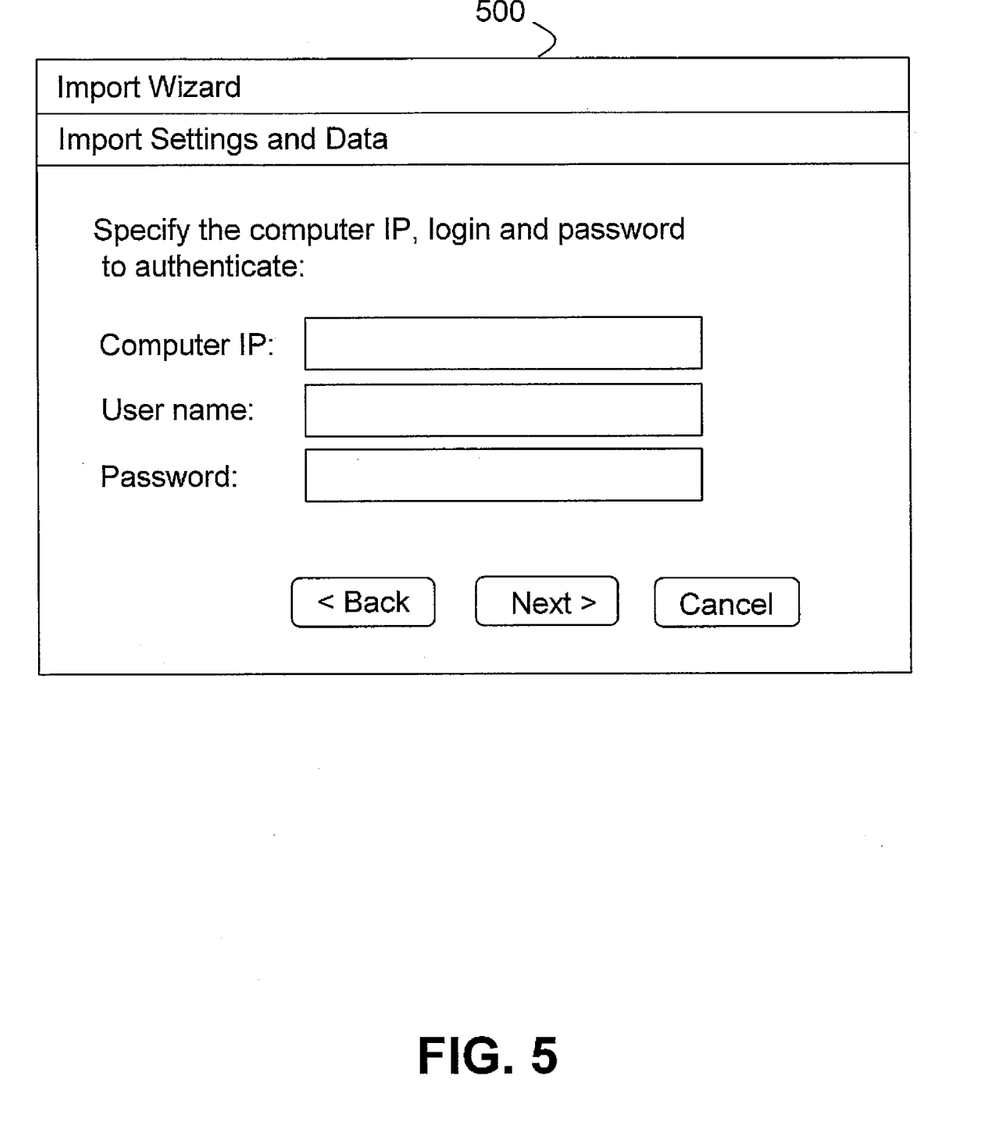

Referring back to FIG. 2, at block 204, a hyperlink import (HI) module of client computer 100 (FIG. 1) is activated. According to one embodiment of the disclosure, the hyperlink import module is activated at the client computer side by selecting a data import icon on the browser of client computer 100. When activated, the data import icon enables a client user to import options, bookmarks, browsing history, passwords, and other browsing related data from host computer 150 (FIG. 1). This is shown in FIG. 4, which illustrates a display screenshot of an exemplary import wizard 400. According to the example shown in FIG. 4, a client user has the option of selecting to import data from another browser on the same client computer or from host computer 150 (FIG. 1).

From block 204 of FIG. 2, the process continues to block 206 which illustrates HI utility 148 (FIG. 1) authenticating client computer 100 (FIG. 1). The authentication by a client user at client computer 100 enables access to the hyperlink addresses that have been previously copied (block 202) to memory in host computer 150 (FIG. 1). The authentication step 206 is further illustrated with reference to FIG. 5, which illustrates an exemplary authentication window 500, which contains authentication fields (e.g., host computer's IP address, client user's user name and password) that must be completed before the import of data can occur.

At decision block 208 of FIG. 2, HI utility 148 determines that client computer 100 (FIG. 1) cannot be authenticated, the process returns to block 206. However, if HI utility 148 determines in decision block 208 that client computer 100 is authenticated, the process continues to block 210, which illustrates HI utility 148 receiving a user selection of a subset of the copied hyperlink addresses from the number of copied hyperlink addresses previously selected in host computer 150 (FIG. 1).

Figure 6:
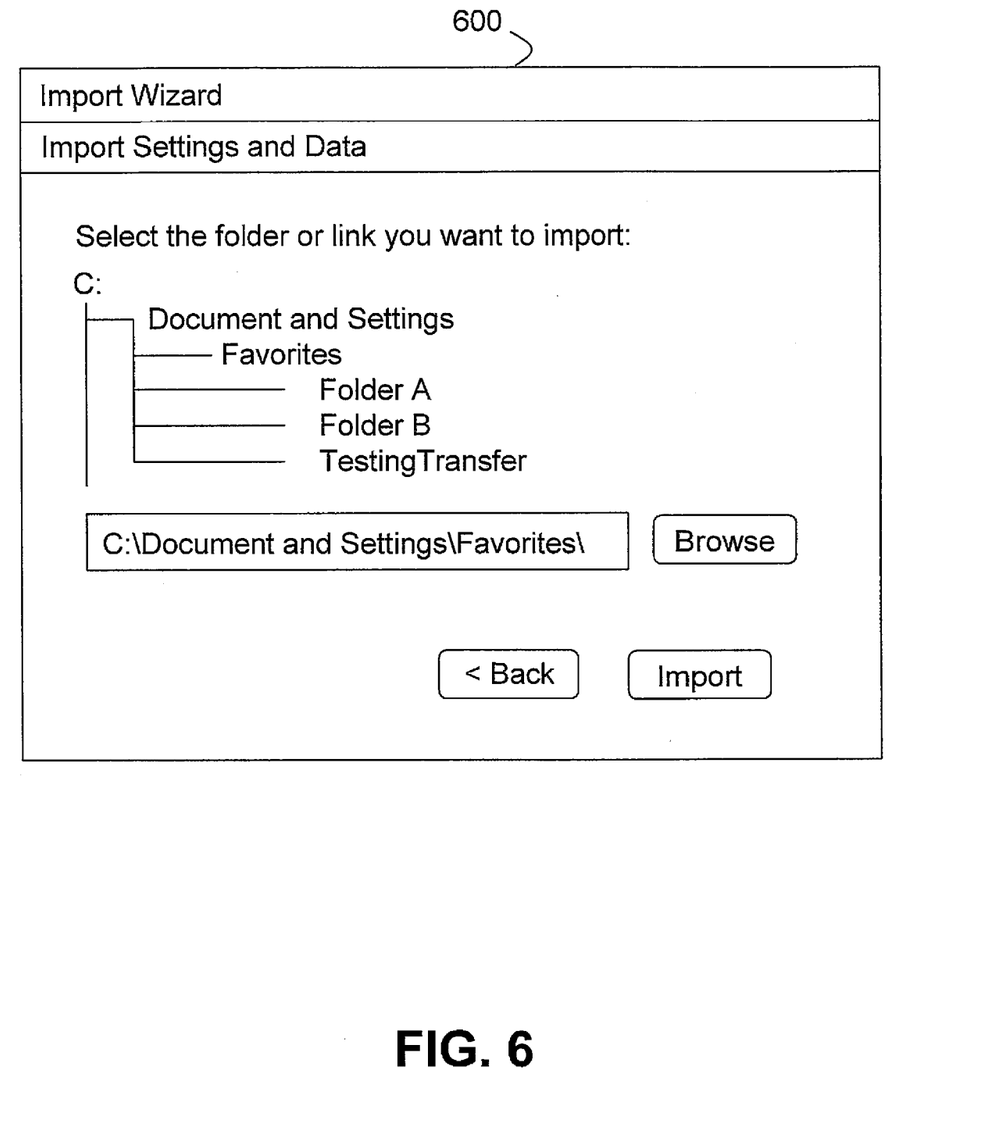
Figure 7:
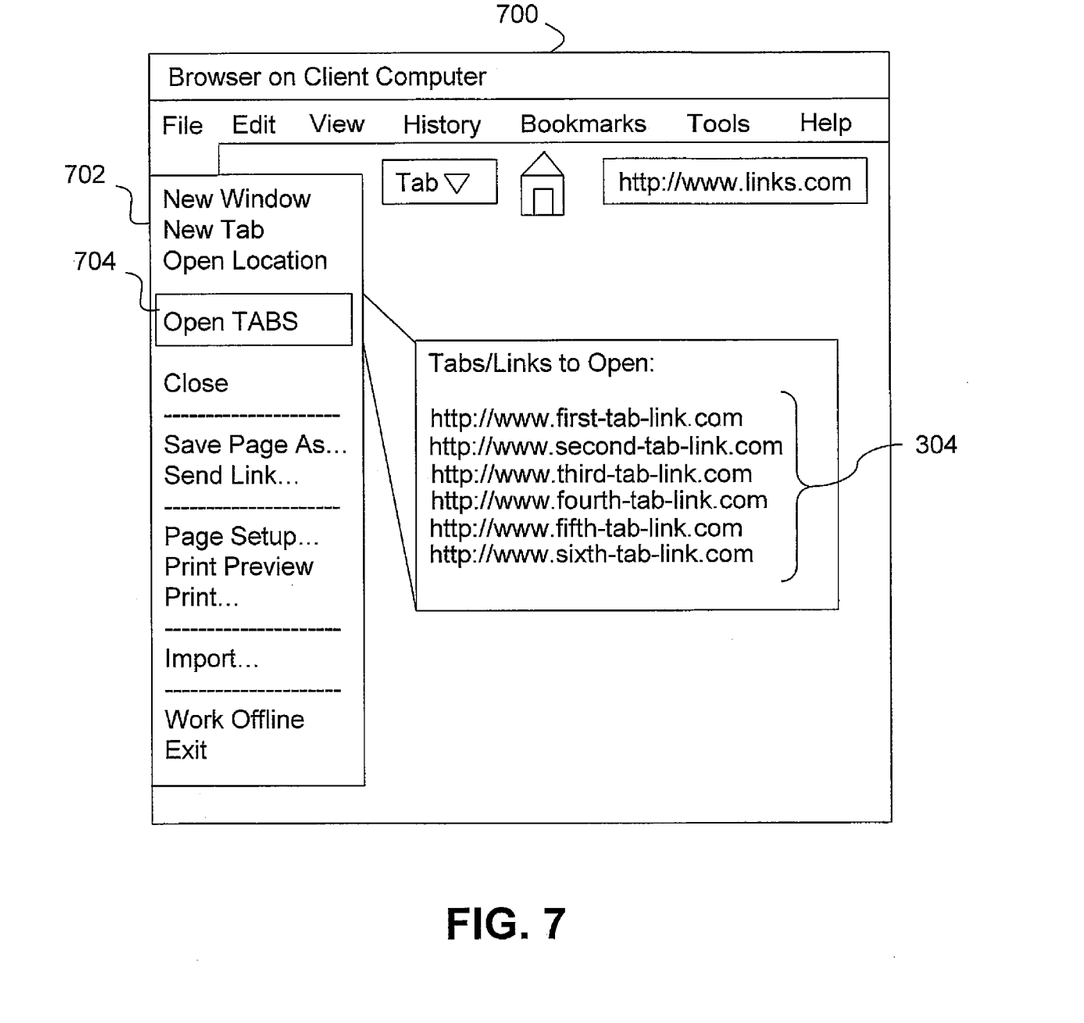
FIG. 7 is a graphical representation of a browser screenshot displaying imported hyperlink addresses using HI utility in accordance with one embodiment of the present invention.

According to an exemplary embodiment illustrated in FIG. 6, a file or folder browsing directory window 600 is displayed to a user. For example, a user on the client computer may select the arbitrary folder "TestingTransfer", which contains various hyperlink addresses 304 (FIG. 3) selected by the user in host computer 150 (FIG. 1). However, according to another exemplary embodiment, it should be noted that the subset of the copied hyperlink addresses can be a subset of the hyperlink addresses included in the folder "TestingTransfer". Once selected (e.g., by selecting "Import" button on screen), only the subset of copied hyperlink addresses is transferred (block 212 of FIG. 2) from host computer 150 (FIG. 1) to client computer 100 (FIG. 1) via a peer-to-peer protocol (i.e., File Transfer Protocol (FTP) or HyperText Transfer Protocol (HTTP)). By only transferring a subset of the selected hyperlink addresses, bandwidth associated with the transfer is decreased. From block 212, the process continues to block 214 of FIG. 2, which illustrates HI utility 148 receiving a user request to open the browser tabs corresponding to the second selected number of hyperlink addresses. In this regard, the browser tabs are opened in browser 146 (FIG. 1) of client computer 100. This is shown in FIG. 7, which shows an exemplary browser window 700 having a drop-down menu 702 that allows a user on a client computer to request HI utility 148 to open the tabs (e.g., using "Open TABS" option 704) associated with the imported hyperlink addresses 304 (FIG. 3).

Returning to FIG. 2, the opened tabs associated with imported hyperlink addresses 304 are displayed via display 110 (FIG. 1) and browser 146 (FIG. 1) of client computer 100 (FIG. 1). The process ends at termination block 218.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a tangible computer-usable storage medium having computer-usable program code embodied in the storage medium and therein processible by a computer.

Any suitable tangible computer-usable or computer-readable storage medium may be utilized. The tangible computer-usable or computer-readable storage medium may be, for example but not limited to, an electronic, magnetic, optical, electromagnetic, infrared, or semiconductor system, apparatus, device, or propagation medium. More specific examples (a non-exhaustive list) of the tangible computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the tangible, computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer data storage. In the context of this document, a tangible computer-usable or computer-readable storage medium may be any medium that can contain, store, communicate, propagate, or transport the program for use by or in connection with the instruction execution system, apparatus, or device. The computer-usable storage medium may include a propagated data signal with the computer-usable program code embodied therewith, either in baseband or as part of a carrier wave. The computer-usable program code may be transmitted using any appropriate medium, including but not limited to the Internet, wireline, optical fiber cable, RF, etc.

Computer program code for carrying out operations of the present invention may be written in an object oriented programming language such as Java® (JAVA is a trademark or registered trademark of Sun Microsystems, Inc. in the United States and other countries), Smalltalk® (SMALLTALK is a trademark or registered trademark of Cincom Systems, Inc.), C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable data storage that can direct a computer or other programmable data processing apparatus to function in a particular manner, such that the instructions stored in the computer-readable data storage produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions/acts specified in the flowchart and/or block diagram block or blocks.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for transferring selected open browser tabs from a host computer to a client computer, said method comprising:

copying a selected number of hyperlink addresses out of a plurality of hyperlink addresses associated with a plurality of selected open browser tabs in a first browser of said host computer;

activating a hyperlink import module of said client computer, wherein said hyperlink import module is configured for transferring said copied hyperlink addresses from said host computer;

authenticating said client computer for access to said copied hyperlink addresses from said host computer;

in response to authenticating said client computer, selecting a subset of said selected number of said copied hyperlink addresses from said host computer;

transferring only said subset of said copied hyperlink addresses from said host computer to said client computer, wherein a bandwidth associated with said transfer is decreased;

opening said subset of said copied hyperlink addresses in a second browser of said client computer; and displaying via a display said subset of said copied hyperlink addresses in said second browser.

2. The computer-implemented method of claim 1, wherein said hyperlink import module is activated by selecting a hyperlink import icon on said first browser of said host computer.

3. The computer-implemented method of claim 1, wherein said selected number of hyperlink addresses is copied to a single folder of said host computer.

4. The computer-implemented method of claim 1, wherein said transferring is via a peer-to-peer protocol from a group comprising File Transfer Protocol (FTP) and HyperText Transfer Protocol (HTTP).

5. A system for transferring selected open browser tabs from a host computer to a client computer, comprising:

a processor; and a memory coupled to said processor; and a hyperlink import utility stored within said memory and executable on said processor for:

copying a selected number of hyperlink addresses out of a plurality of hyperlink addresses associated with a plurality of selected open browser tabs in a first browser of said host computer;

activating a hyperlink import module of said client computer, wherein said hyperlink import module is configured for transferring said copied hyperlink addresses from said host computer;

authenticating said client computer for access to said copied hyperlink addresses from said host computer;

in response to authenticating said client computer, selecting a subset of said selected number of said copied hyperlink addresses from said host computer;

transferring only said subset of said copied hyperlink addresses from said host computer to said client computer, wherein a bandwidth associated with said transfer is decreased;

opening said subset of said copied hyperlink addresses in a second browser of said client computer;

displaying via a display said subset of said copied hyperlink addresses in said second browser.

6. The system of claim 5, wherein said hyperlink import module is activated by selecting a hyperlink import icon on said first browser of said host computer.

7. The system of claim 5, wherein said selected number of hyperlink addresses is copied to a single folder of said host computer.

8. The system of claim 5, wherein said transferring is via a peer-to-peer protocol from a group comprising File Transfer Protocol (FTP) and HyperText Transfer Protocol (HTTP).

9. A computer program product for transferring selected open browser tabs from a host computer to a client computer, said computer program product comprising:

a processor-usable memory having program code embodied therein, said program code comprising:

program code configured for copying a selected number of hyperlink addresses out of a plurality of hyperlink addresses associated with a plurality of selected open browser tabs in a first browser of said host computer;

program code configured for activating a hyperlink import module of said client computer, wherein said hyperlink import module is configured for transferring said copied hyperlink addresses from said host computer;

program code configured for authenticating said client computer for access to said copied hyperlink addresses from said host computer;

program code configured for, in response to authenticating said client computer, selecting a subset of said selected number of said copied hyperlink addresses from said host computer;

program code configured for transferring only said subset of said copied hyperlink addresses from said host computer to said client computer, wherein a bandwidth associated with said transfer is decreased;

program code configured for opening said subset of said copied hyperlink addresses in a second browser of said client computer; and program code configured for displaying via a display said subset of said copied hyperlink addresses in said second browser.

10. The computer program product of claim 9, wherein said hyperlink import module is activated by program code configured for selecting a hyperlink import icon on said first browser of said host computer.

11. The computer program product of claim 9, wherein said selected number of hyperlink addresses is copied to a single folder of said host computer.

12. The computer program product of claim 9, wherein said transferring is via a peer-to-peer protocol from a group comprising File Transfer Protocol (FTP) and HyperText Transfer Protocol (HTTP).

* * * * *